US009220987B2

(12) United States Patent
Obana (10) Patent No.: US 9,220,987 B2
(45) Date of Patent: Dec. 29, 2015

(54) METHOD OF EXCHANGING DATA BETWEEN COMMUNICATION TERMINALS

(75) Inventor: Kazutoshi Obana, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 411 days.

(21) Appl. No.: 13/461,470

(22) Filed: May 1, 2012

(65) Prior Publication Data

US 2013/0165172 A1 Jun. 27, 2013

(30) Foreign Application Priority Data

Dec. 26, 2011 (JP) ................................. 2011-283690

(51) Int. Cl.
| | |
|---|---|
| *A63F 13/795* | (2014.01) |
| *H04W 4/02* | (2009.01) |
| *H04L 29/06* | (2006.01) |
| *A63F 13/327* | (2014.01) |
| *A63F 13/335* | (2014.01) |
| *A63F 13/798* | (2014.01) |
| *H04W 88/06* | (2009.01) |

(52) U.S. Cl.
CPC .............. *A63F 13/795* (2014.09); *A63F 13/327* (2014.09); *A63F 13/335* (2014.09); *A63F 13/798* (2014.09); *H04L 67/38* (2013.01); *H04W 4/023* (2013.01); *H04W 88/06* (2013.01)

(58) Field of Classification Search
CPC .............................. H04W 76/005; H04W 4/10
USPC ........................................................ 455/518
See application file for complete search history.

(56) References Cited

U.S. PATENT DOCUMENTS

| | | | |
|---|---|---|---|
| 6,519,472 B1 * | 2/2003 | Brennan et al. .............. 455/518 |
| 7,231,211 B2 * | 6/2007 | Dunham .................... 455/426.1 |
| 7,395,507 B2 * | 7/2008 | Robarts et al. ............... 715/744 |
| 7,412,389 B2 * | 8/2008 | Yang ............................ 704/260 |
| 7,478,129 B1 * | 1/2009 | Chemtob ...................... 709/204 |
| 7,487,211 B2 * | 2/2009 | Beavers et al. .............. 709/205 |
| 7,505,779 B1 * | 3/2009 | David ........................... 455/518 |
| 7,616,615 B2 * | 11/2009 | Sueyoshi et al. ............. 370/338 |
| 7,787,870 B2 * | 8/2010 | Burgan et al. ................ 455/415 |
| 7,831,034 B2 * | 11/2010 | Maximo et al. .............. 379/352 |

(Continued)

FOREIGN PATENT DOCUMENTS

JP 2002-165009 6/2002

OTHER PUBLICATIONS

Nintendo 3DS Operations Manual w/ English counterpart, *Nintendo of America, Inc.*, No Date, 108 pgs—Japanese Manual; 52 pgs—English Manual.

*Primary Examiner* — Hai V Nguyen
(74) *Attorney, Agent, or Firm* — Nixon & Vanderhye P.C.

(57) ABSTRACT

A communication system which includes a plurality of communication terminals, each communication terminal includes: a memory that stores a group attribute representative of an attribute of a group, the group attribute assigned to a communication terminal or a user of the communication terminal; a communication unit that transmits the group attribute stored in a memory of a correspondent terminal located within a predetermined range from the communication terminal, and receives a group attribute stored in a memory of the correspondent terminal; and a controller that compares the group attribute received by the communication unit with the group attribute stored in the memory of the communication terminal and initiates selectively one of a first information processing and a second information processing based on a result of the comparison.

12 Claims, 4 Drawing Sheets

(56) References Cited

U.S. PATENT DOCUMENTS

| | | | |
|---|---|---|---|
| 7,925,289 B2* | 4/2011 | David | 455/518 |
| 7,986,677 B2* | 7/2011 | Park et al. | 370/338 |
| 8,112,036 B2* | 2/2012 | Matsuo et al. | 455/41.2 |
| 8,145,199 B2* | 3/2012 | Tadayon et al. | 455/418 |
| 8,390,670 B1* | 3/2013 | Gottlieb | 348/14.12 |
| 8,405,702 B1* | 3/2013 | Gottlieb | 348/14.08 |
| 8,417,777 B2* | 4/2013 | Hutchison et al. | 709/204 |
| 8,435,114 B2* | 5/2013 | Kamiya et al. | 463/29 |
| 8,540,563 B2* | 9/2013 | Ghaly | 463/20 |
| 8,701,004 B2* | 4/2014 | Hoerentrup et al. | 715/716 |
| 8,718,598 B2* | 5/2014 | Johnson | 455/404.2 |
| 8,752,100 B2* | 6/2014 | Ramakrishnan et al. | 725/90 |
| 8,758,140 B2* | 6/2014 | Hall et al. | 463/42 |
| 8,902,272 B1* | 12/2014 | Gottlieb | 348/14.01 |
| 2005/0221883 A1* | 10/2005 | Lind et al. | 463/19 |
| 2005/0262542 A1* | 11/2005 | DeWeese et al. | 725/106 |
| 2006/0052057 A1* | 3/2006 | Persson et al. | 455/41.2 |
| 2006/0064476 A1* | 3/2006 | Decasper et al. | 709/223 |
| 2008/0010594 A1* | 1/2008 | Hoerentrup et al. | 715/703 |
| 2008/0080688 A1* | 4/2008 | Burgan et al. | 379/142.04 |
| 2008/0274810 A1* | 11/2008 | Hayashi et al. | 463/40 |
| 2009/0124324 A1* | 5/2009 | Malle et al. | 463/17 |
| 2009/0176524 A1* | 7/2009 | David | 455/518 |
| 2009/0253374 A1* | 10/2009 | Matsuo et al. | 455/41.2 |
| 2010/0082652 A1* | 4/2010 | Jones et al. | 707/758 |
| 2010/0151817 A1* | 6/2010 | Lidstrom et al. | 455/405 |
| 2010/0205037 A1* | 8/2010 | Besehanic | 705/10 |
| 2011/0029611 A1* | 2/2011 | Hutchison et al. | 709/204 |
| 2012/0190415 A1* | 7/2012 | Gardner et al. | 463/2 |
| 2012/0238285 A1* | 9/2012 | Yariv et al. | 455/456.1 |
| 2012/0316403 A1* | 12/2012 | Hogan | 600/300 |
| 2013/0251328 A1* | 9/2013 | Gilley et al. | 386/200 |
| 2013/0282818 A1* | 10/2013 | Hutchison et al. | 709/204 |
| 2013/0305322 A1* | 11/2013 | Raleigh et al. | 726/4 |
| 2013/0337774 A1* | 12/2013 | Johnson | 455/411 |
| 2013/0337841 A1* | 12/2013 | Johnson | 455/456.3 |

* cited by examiner

| No. | MAC ADDRESS 1 | GROUP ATTRIBUTE | WIN/LOSE | ADDITIONAL INFORMATION |
|---|---|---|---|---|
| | MAC ADDRESS 2 | | | |
| 1 | 11.11.11.12.34.56 | RED | LOSE | DATE AND TIME: 2011.11.11  17:50 |
| | 11.11.11.12.03.19 | WHITE | WIN | |
| 2 | 11.11.11.12.34.08 | RED | WIN | DATE AND TIME: 2011.11.11  17:49 |
| | 11.11.11.15.55.55 | WHITE | LOSE | |
| 3 | 11.11.11.12.34.29 | RED | LOSE | DATE AND TIME: 2011.11.11  17:46 |
| | 11.11.11.12.03.00 | WHITE | WIN | |
| ⋮ | ⋮ | ⋮ | ⋮ | ⋮ |

METHOD OF EXCHANGING DATA BETWEEN COMMUNICATION TERMINALS

CROSS-REFERENCE TO RELATED APPLICATIONS

This application is based on and claims priority under 35 U.S.C. 119 from Japanese Patent Application No. 2011-283690, which was filed on Dec. 26, 2011.

BACKGROUND

1. Technical Field

The present invention relates to data communication between communication terminals.

2. Related Art

A mobile communication terminal capable of communicating with other terminals located in a predetermined area is known.

SUMMARY

In an aspect of the present invention, there is provided a communication system which includes a plurality of communication terminals, each communication terminal including: a memory that stores a group attribute representative of an attribute of a group, the group attribute assigned to a communication terminal or a user of the communication terminal; a communication unit that transmits the group attribute stored in a memory of a correspondent terminal located within a predetermined range from the communication terminal, and receives a group attribute stored in a memory of the correspondent terminal; and a controller that compares the group attribute received by the communication unit with the group attribute stored in the memory of the communication terminal and initiates selectively one of a first information processing and a second information processing based on a result of the comparison.

BRIEF DESCRIPTION OF THE DRAWINGS

Exemplary embodiments of the present invention will now be described in detail based on the following figures, wherein.

DETAILED DESCRIPTION

1. Configuration

Figure 1:
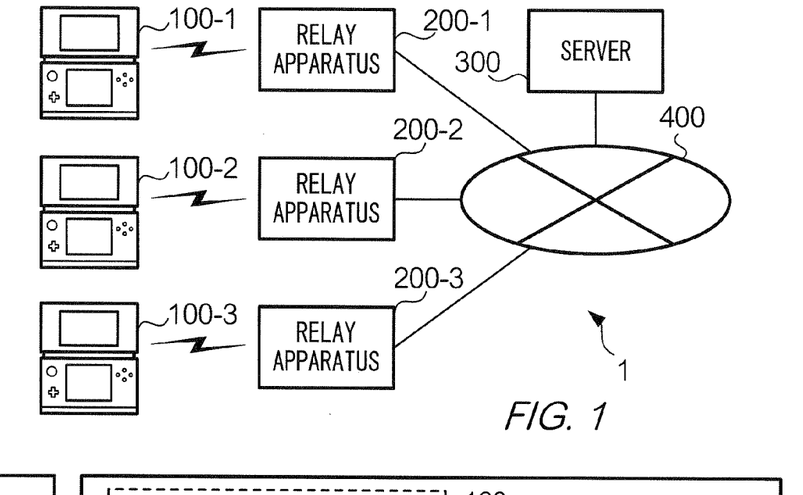
FIG. 1 is a schematic diagram of a communication system 1.

FIG. 1 is a schematic representation of a communication system 1 according to an exemplary embodiment of the present invention. As shown in the FIG. 1, communication system 1 includes communication terminals 100 (100-1, 100-2, 100-3), relay apparatuses 200 (200-1, 200-2, 200-3), Internet 400, and server 300. Communication terminals 100 are carried by users. Relay apparatuses 200 and server 300 are connected with Internet 400. Relay apparatuses 200 are provided in different locations and are capable of communicating by radio with one or more communication terminals 100 located within a predetermined range from relay apparatuses 200. Each of communication terminals 100 exchanges information with server 300 via relay apparatuses 200. Also, each of communication terminals 100 is capable of transmitting a radio wave within a predetermined range for wireless communication with other communication terminals 100 located within the predetermined transmission range. Hereinafter, communication of this type will be referred to as "inter-terminal communication." The predetermined range may be 30 meters, for example. Each communication terminal 100 has the same function. Similarly, each relay apparatus 200 has the same function as described above. Thus, hereinafter the terms "communication terminal 100" and "relay apparatus 200" will be used unless it is necessary to distinguish one of more of the terminals or apparatuses.

Figure 2:
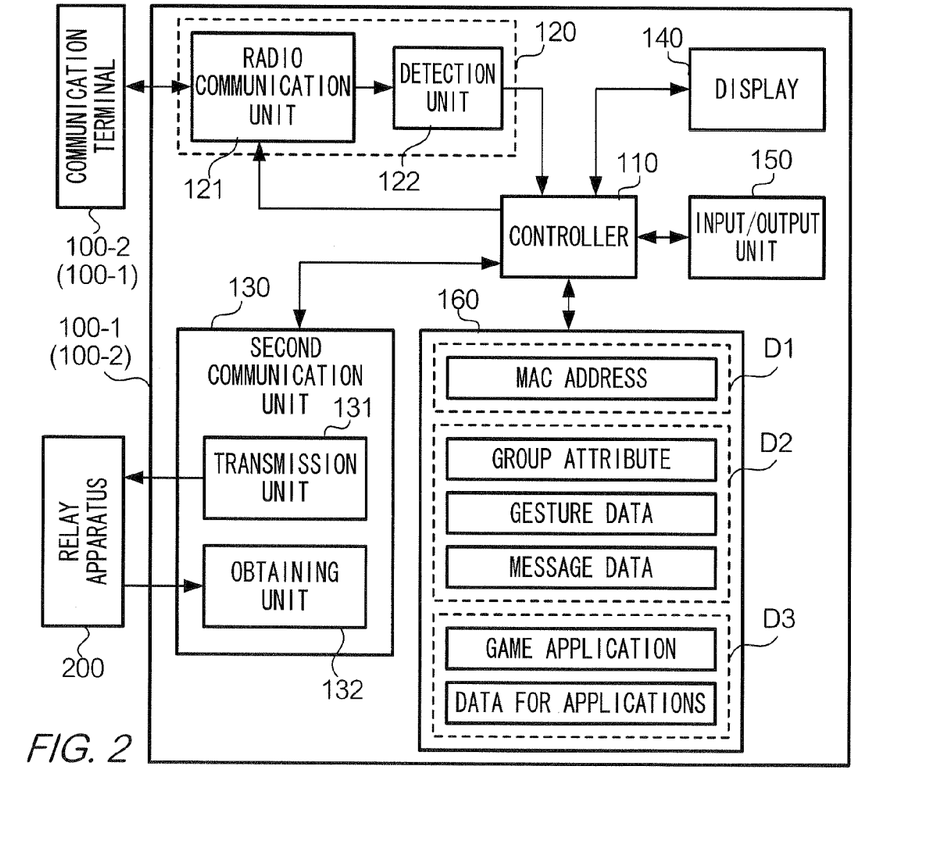
FIG. 2 is a block diagram of a communication terminal 100.

FIG. 2 is a block diagram showing functions of communication terminal 100. As shown in the figure, communication terminal 100 includes a controller 110, first communication unit 120, second communication unit 130, display 140, input/output unit 150, and storage unit 160 in terms of function. First communication unit 120 includes a radio communication unit 121 and detection unit 122. In controller 110 a CPU or other processor implements control first communication unit 120, second communication unit 130, display 140, and input/output unit 150 as well as execute an OS stored in storage unit 160 and application programs (hereinafter, "applications") to implement particular functions in communication terminal 100. Radio communication unit 121 implements an antenna and radio communication circuit for transmission of data by radio via IEEE802.1 or another protocol for radio communication and outputs data received from another communication terminal 100 (hereinafter, "correspondent terminal") to detection unit 122 under control of controller 110. Detection unit 122 implements a signal processing circuit that interprets a signal supplied by radio communication unit 121 to detect a correspondent terminal communicable with communication terminal 100 located nearby. A result of the detection is output to controller 110. It is noted that first communication unit 120 may implement a single module.

More specifically, first communication unit 120 searches for a communication terminal located in the predetermined range, establishes a radio link with the detected correspondent terminal, and initiates exchange of data on the radio link with the detected correspondent terminal. Each of the search, the radio link establishment, and exchange of data is carried out automatically.

Details of the operation will now be described. Hereinafter, a situation will be described in which a correspondent terminal of communication terminal 100-1 is communication terminal 100-2. First communication units 120 of each of communication terminal 100-1 and communication terminal 100-2 intermittently transmits a beacon by radio via a predetermined communication protocol to monitor whether a correspondent terminal appears in the predetermined range. The predetermined range is a range within which a radio wave transmitted by communication terminal 100-1 is reachable by a terminal. The predetermined communication protocol is a protocol for switching operation modes of communication terminal 100 between a master mode and slave mode at a predetermined time interval, which interval may be either regular or irregular. More specifically, in a master mode, communication terminal 100-1 transmits intermittently a beacon signal including an identifier of communication terminal 100 and monitors whether a signal in which the identifier of communication terminal 100-1 is received. In slave mode, communication terminal 100 monitors whether a beacon signal is received without transmitting the beacon signal. Upon receipt of the beacon signal in which an identifier of communication terminal 100 other than communication terminal 100-1 is included, communication terminal 100-1 transmits by radio a response signal in which the received identifier and the identifier of communication terminal 100-1. The identifiers may be MAC addresses, for example. Hereinafter, description will be given where a MAC address is employed as an identifier of communication terminal 100.

Supposing that communication terminal 100-1 is in master mode and communication terminal 100-2 is in slave mode, and communication terminals 100-1 and 100-2 are within a predetermined distance of each other for communication. At this juncture, in communication terminal 100-2 controller 110 determines that communication terminal 100-1 is communicable with upon receipt of an identifier of communication terminal 100-1, and accordingly, communication terminal 100-2 operates in slave mode for communication with 100-1 henceforth. By doing so, a master device (100-1) and a slave device (100-2) recognize each other as communicable correspondents. Next, a condition regarding a radio channel, encryption key, and other setting parameters is determined, such that communication terminals 100-1 and 100-2 become ready for data communication with each other. Data exchanged on the radio link necessarily includes MAC addresses of communication terminals 100-1 and 100-2 to identify a sender and receiver of the data.

Second communication unit 130 implements an antenna and radio communication circuit that communicates with server 300 connected to Internet 400 under control of controller 110 via relay apparatus 200 via a prescribed protocol for wireless communication such as IEEE802.11a. Specifically, second communication unit 130 includes a transmission unit 131 and an obtaining unit 132. Transmission unit 131 transmits to server 300 a result of processing performed by an application, information input by a user, and the like. Obtaining unit 132 receives information transmitted by server 300 and supplies the received information to controller 110. The supplied information may then be supplied to display 140, input/output unit 150, and/or storage unit 160 under control of controller 110. It is possible for a like hardware module including an antenna and a control circuit to be provided in each of first communication unit 120 and second communication unit 130.

Display 140 includes a LCD panel, an image processing circuit, and the like for display of an image under control of controller 110. Input/output unit 150 includes: a keypad, buttons, cursor keys, or the like, which are used for manipulating an application or inputting information; a speaker and microphone and other devices for inputting and outputting information by sound; a memory slot or other devices for storing information in an external storage media; and other means for inputting/outputting data. Storage unit 160 is a RAM, ROM, hard drive or other storage unit for storing information of types D1, D2, and D3. Information type D1 includes: setting information necessary for radio communication with a correspondent terminal including a MAC address; attributes of communication terminal 100 including a number of times power is turned on, an accumulated time during which communication terminal 100 has been used, and the like; and an operating system (OS) of communication terminal 100. Information type D2 is information provided to a correspondent terminal when inter-terminal communication is performed, which includes: a group attribute; data used for a game application; message data; and user attribute such as sex or age. Information type D3 includes application programs and data (avatar or other image data) used for the applications to perform particular function(s) in communication terminal 100. For example, the game application may be an application program that enables the users of two communication terminals 100 communicable with each other via a radio link to play a game such as rock-paper-scissors (RPS). The game may include a game played by virtual characters or avatars.

A group attribute is information that represents an attribute of a group to which each communication terminal 100 or a user of each communication terminal 100 belongs. Fore example, the group attribute is an identifier identifying either of the teams "Red" or "White" to which a user or communication terminal 100 belongs. Other grouping methods can be employed. A grouping is not limited to that described above; and may be one by which "the first group," "the second group," . . . , and "the n-th group" is employed. Further, there is no limit on how, by whom, and when a group is determined. A group attribute may be assigned to each communication terminal 100 or each user. In a case where the group attribute is assigned to each user, group attributes for all of the users of a single communication terminal 100 may be stored in storage unit 160 of the single communication terminal 100. In this case, a current user may be identified based on login information, or the like, by communication terminal 100 so as to determine which group attribute is valid currently among the registered group attributes. A currently valid group attribute is transmitted to a correspondent terminal.

In one embodiment, the group attribute may be stored in storage unit 160 before communication terminal 100 is sold to a user. In another embodiment, communication terminal 100 may determine the group attribute at a predetermined timing using a predetermined algorithm. An example of the predetermined algorithm is an algorithm using random numbers. The group attribute may be fixed or variable. In a case where the group attribute is variable, the group attribute may be notified to communication terminal 100 by server 300. In a case where two or more kinds of grouping are introduced, one of which is "Red" and "White" and another of which is "A" and "B," the group attribute may indicate at least one of the groups a communication terminal 100 belongs to or a combination of all the groups. Alternatively, each communication terminal 100 may determine the group attributes of the 100 based on data stored in each storage unit 160, which data may include image data of a character (avatar) which is a graphical object in a virtual space manipulated by a user and used by an application, or on an image data of a part of the avatar (for example, a face). In one embodiment, communication terminal 100 may determine group attributes based on user attributes (age, sex, address, etc.,). For the sake of convenience, hereinafter it is assumed that group attributes representing either "Red" or "White" are stored in storage unit 160 of each communication terminal 100. In other words, communication terminal 100 belongs to either the team Red or the team White.

Gesture data is data generated by communication terminal 100 in accordance with a user's input during implementation of the game application. The gesture data is sent to a correspondent terminal and received from the correspondent terminal via the inter-terminal communication. For example, after a game application of rock-paper-scissors is executed and a user selects one of rock, paper, or scissors, the gesture data represents the selected one. Message data is data transmitted/received to and from a correspondent terminal; for example, a text message "Hello."

Controller 110 obtains group attributes of a correspondent terminal participating in inter-terminal communication via detection unit 122 by execution of, for example, a particular application, and compares the obtained group attributes with the group attributes stored in storage unit 160, and initiates selectively either the first information processing or the second information processing based on a result of the comparison. For example, the first information processing can be defined as an implementation of a part of a function(s) of all the functions performable by an application, and the second information processing as the remaining part of the functions. Specifically, when a game applicaiton is a rock-paper-scissors game played by two users, the first information processing includes: obtaining gesture data, comparing the gesture data, and displaying a result of the comparison; and the second information processing includes displaying a received message of the correspondent terminal (i.e., the opponent of the PRS game). Controller 110 transmits an output of the first information processing to server 300 via second communication unit 130 together with an identifier of communication terminal 100 indicative of a sender.

In another embodiment, the first and second information processing correspond to execution of the first and second applications, which are independent from each other, respectively. Simply put, controller 110 initiates different processes according to a result of a comparison of the group attributes performed in communication terminal 100.

Communication terminal 100 may be in either a normal mode or a sleep mode (i.e., power-saving mode), each of which modes are provided for in communication terminal 100. In the sleep mode, a part of functions performable by communication terminal 100 can be activated. For example, a function of performing the inter-terminal communication may be kept active in the sleep mode. The normal mode may be set immediately after power is turned on. A user may initiate a change from normal mode to sleep mode by way of a predetermined operation such as pushing a button on or folding a body of communication terminal 100, or the like. Alternatively, the sleep mode may be entered automatically from the normal mode when an operation by the user is not detected for a predetermined time period.

Any method of determining functions performable in the sleep mode can be adapted. For example, applications executable in the sleep mode may be registered in advance in communication terminal 100, and whether an instruction input of a user for executing an application is accepted based on the registration. Alternatively, when an application capable of performing functions is executed, the application may be configured to read a setting file defining each of the functions as activatable or de-activatable in the normal mode and in the sleep mode, so as to determine which of the functions is allowed to become active. If an execution of an unregistered function is requested, controller 110 may refuse the request.

Hereinafter, description will be directed to an example of an operation in which the game application performs Functions 1 through 6 described below. Function 1 consists of exchanging data with a correspondent terminal, the data including information type D2 that includes group attributes, gesture data, and message data. Function 2 consists of comparing gesture data of communication terminal 100 and the correspondent terminal Function 3 consists of determining a match result (win/loss and optionally draw) based on the comparison. Function 4 consists of storing the match result in storage unit 160. Function 5 consists of displaying the match result. Function 6 consists of obtaining compiled results of games. Function 7 consists of performing rendering based on the message data received from the correspondent terminal. Supposing that Functions 1 through 4 are performable in the normal mode or the sleep mode, whereas Functions 5 through 7 are performable only in the normal mode. Function 5, and Functions 6 and 7 following thereafter are optional depending on an output due to an implementation of Function 2.

Details of Function 3 will now be described. In performing Function 3, all possible combinations of two sets of gesture data (paper/rock/scissors) and match results (win/lose/draw) are described correspondingly in a table stored in storage unit 160. Referring to the table, a match result is generated based on a pair each of gesture data. For example, when gesture data of communication terminal 100 represents "rock," and gesture data received from the correspondent terminal represents "paper," a generated match result represents "loss."

Figure 3:
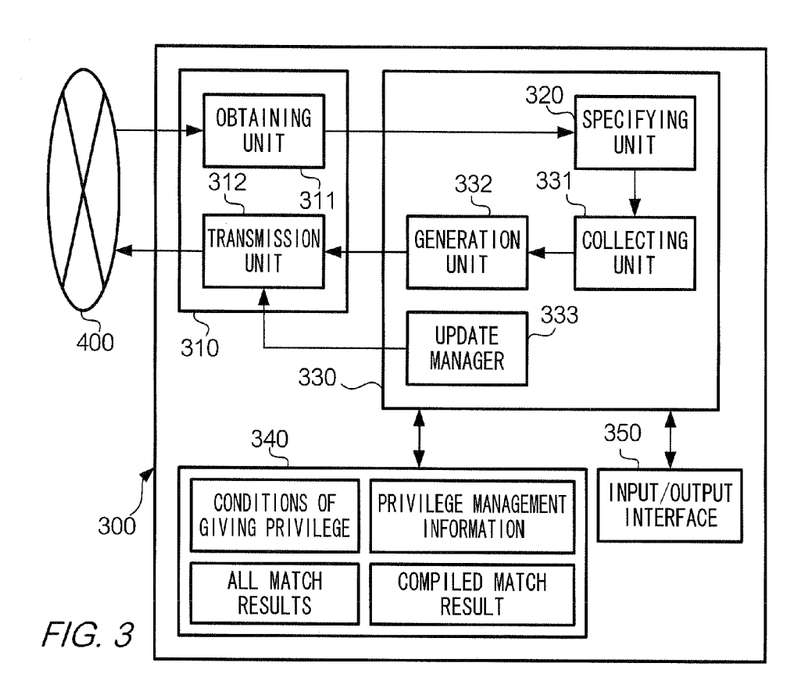
FIG. 3 a block diagram showing functions of a server 300.

FIG. 3 is a block diagram showing functions of server 300. Server 300 includes a communication unit 310, controller 330, storage unit 340, and input/output interface 350. Communication unit 310 includes an obtaining unit 311 and transmission unit 312, in which a communication module that exchanges data with communication terminal 100 via Internet 400 and relay apparatus 200 is implemented. Obtaining unit 311 receives an output of the first processing information and a request for compiled results from communication terminal 100 and outputs the results to specifying unit 320. Transmission unit 312 transmits information supplied by generation unit 332 or update manager 333 to communication terminal 100.

Figure 4:
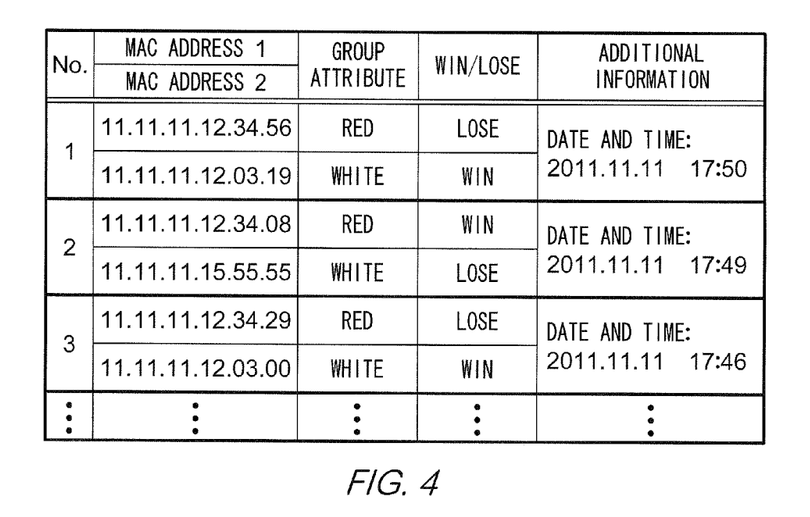
FIG. 4 shows an example of a block diagram showing functions of a server 300.

Storage unit 340 stores match history, privilege condition, compiled results, and privilege management information. Match history includes all match results collected from communication terminals 100 by collecting unit 331. An example of the match history is shown in FIG. 4. In the same figure, the match history contains MAC addresses of communication terminal 100 of players of a game, and group attributes thereof; and a match result of the game is recorded in association with a record number. Optionally, additional information relating to a game may be stored. Additional information may include information on a date, time, and place when a game was played, attributes of communication terminal 100 (model type, identifier of installed applications, etc.), and/or user attributes (name, age, sex, etc.), for example. It is possible to store a user identifier such a user name instead of a MAC address.

A privilege state is used for generating privilege data based on a group attribute. Privilege data is data provided to communication terminal 100 according to a group attribute of communication terminal 100. For example, electronic money, an electronic coupon, items used in a game performed by a game application. In actuality, any format or other details of the privilege data can be adapted as long as such data is generated according to the group attribute. For example, the privilege condition contains a characteristic value (winning rate of a group as a whole, for example) of a group, which is generated by performing statistical analysis of match results pertaining to the group, and details of privilege (an amount of electronic money, for example) associated with each other by a table format.

Compiled results consist of information generated by performing a predetermined statistics on the match history based on the group attribute at collecting unit 331. Privilege management information represents privilege content that is provided with a date and time of issuance.

Controller 330 implements a CPU or other processors and includes a specifying unit 320, collecting unit 331, and generation unit 332. Specifying unit 320 checks whether information supplied by obtaining unit 311 includes identifiers of two communication terminals 100 with regard to inter-terminal communication and a set of group attributes of the two communication terminals 100, and a match result. If the set of information described above is included, specifying unit 320 recognizes an occurrence of inter-terminal communication and a game being parlayed, and outputs an information set to collecting unit 331.

It is noted that if the information set is received from a communication terminal 100-1 (one of the players of a game) of inter-terminal communication after other communication terminal 100-2 (the other player of the game) of the inter-terminal communication, specifying unit 320 determines whether the obtained sets of information pertain to the same game, or to different games played by the same players. Specifically, in a case where information includes a time at which data is exchanged between two communication terminals 100, if the times are identical within a predetermined error, specifying unit 320 determines that the two sets of information pertain to the same game. Alternatively, a time at which the two sets of information are received by obtaining unit 311 in a predetermined time period, the two sets of information may be determined to pertain to the same game. One of obtained information pertaining to the same game is discarded without being output to collecting unit 331, so as to avoid storing the same information on a game twice.

Upon receipt of a request for compiled results from communication terminal 100, specifying unit 320 identifies to collecting unit 331 the communication terminal 100 and group attributes of the communication terminal 100.

Collecting unit 331 adds the information that is supplied by specifying unit 320 and includes a match result, as a new record of the match history in storage unit 340. Collecting unit 331 performs, at a predetermined timing; statistical processing with regard to a group identified by the group attribute on the match history and stores a result of the processing as compiled results in storage unit 340. Specifically, in performing statistical analysis (a group-basis total number of wins and/or losses, for example) of the matches played at communication terminal 100 having a group attribute that is the same as the requesting communication terminal 100 are calculated. Other than the total number of wins/losses for a group, it is possible to perform other statistical and data processing using a predetermined algorithm based on the accumulated match results stored in storage unit 340. For example, regardless of the group attributes, a ranking of users or communication terminals 100 based on the total number of individual users or communication terminals 100, respectively, is generated based on the match history.

On the other hand, collecting unit 331 reads compiled results from storage unit 340 and outputs the results to generation unit 332, in response to a request from a user.

Generation unit 332 determines whether it is necessary to provide privilege data. If determined necessary, generation unit 332 generates privilege data for providing to the requesting communication terminal 100 based on the compiled results output by collecting unit 331 and the privilege condition stored in storage unit 340. The generated privilege data is supplied to the transmission unit 312 together with the compiled results. In one embodiment, whether the accumulated total number of records stored in storage unit 340 or the accumulated number of records pertaining to a requesting communication terminal 100 is greater than a threshold can be taken into account in the determination of the necessity of provision of the privilege data. In another embodiment, content of information transmitted from communication terminal 100 to server 300 in addition to the number of records or a volume of accumulated data may be employed for the determination. In yet another embodiment, the determination is performed based on contents of requests that have been transmitted by a same communication terminal 100.

When a predetermined condition is satisfied, update manager 333 updates the group attributes referring to match results stored in storage unit 340. For example, update manager 333 checks a content of the match history on a regular basis, and if a predetermined condition on match results pertaining to a communication terminal 100 is satisfied, determines, by random selection or based on a math history of the communication terminal 100 or of a user of the communication terminal 100, new group attributes for the communication terminal 100 or the user and transmits to the terminal an instruction of rewriting the group attribute. The predetermined condition may be whether the total number of games played by a communication terminal 100 exceeds a threshold value, for example. Upon receipt of the instruction, the communication terminal 100 rewrites group attributes stored in storage unit 160 accordingly.

Input/output interface 350 is a device for inputting and outputting information, that may include a display, keyboard, and the like, that is configured to receive instructions and information to be stored in storage unit 340, which are input by an administrative user of server 300.

2. Operation (1) From a Start of Inter-Terminal Communication to Reporting to Server 300

Figure 5:
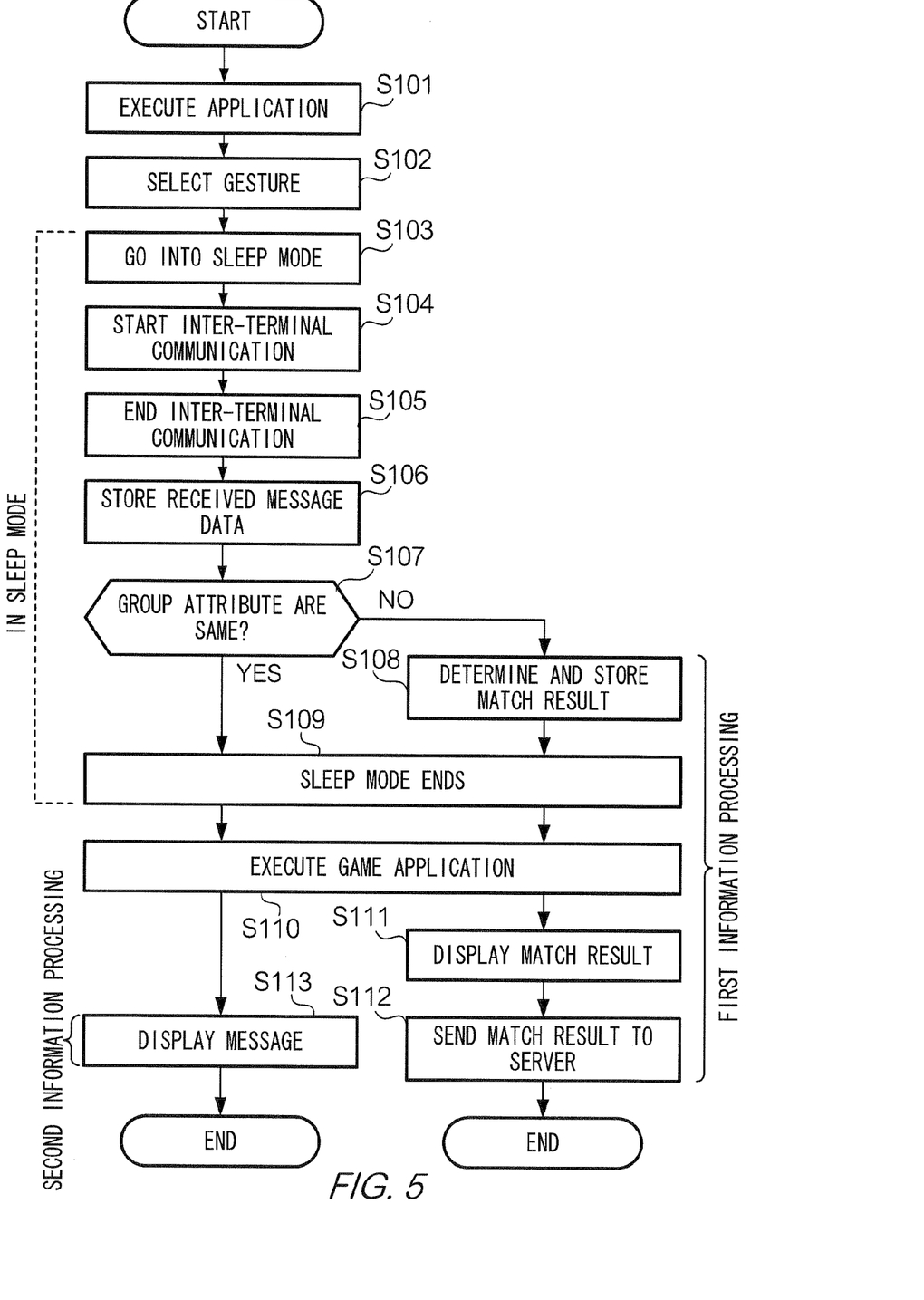
FIG. 5 shows an example of operation of communication terminal.

FIG. 5 shows an example of operation of communication system 1. It is supposed that hereinafter, communication terminals 100-1 and 100-2 initiate the inter-terminal communication. It is noted that steps performed by communication terminals 100-1 and 100-2 are the same. An order of the steps is as shown in the figure in both communication terminals 100-1 and 100-2, but timings of performing the steps in 100-1 and 100-2 are not necessarily to be synchronized perfectly, except for the inter-terminal communication. Generally, a timing at which the game application is executed (S101) and a timing at which the sleep mode ends in 100-1 and 100-2 may be different.

First, in communication terminal 100 a user performs a predetermined manipulation to execute a game application. Hereinafter, it is supposed that, the game application enables users to play a rock-paper-scissors game with communication terminals 100-1 and 100-2 (S101). When the game applicaiton is executed, each user picks a gesture (paper, rock, or scissors) in accordance with instructions displayed in a display and inputs accordingly (S102). Input data is stored in storage unit 160 as gesture data. After that, it is assumed that communication terminal 100 goes into sleep mode (S103). In the sleep mode, first communication unit 120 active searches for a communicable correspondent terminal.

It is supposed that communication terminal 100-2, which will be a correspondent terminal of 100-1, is in the sleep mode after execution of the game application, similar to 100-1, and that communication terminals 100-1 and 100-2 have moved to a location in which communication terminals 100-1 and 100-2 are located at a predetermined distance. At this juncture, a radio link is established (S104) between communication terminal 100-1 and 100-2. In communication terminal 100-1, Function 1 is performed and the user identifier, group attributes, gesture data, the message data are read from storage unit 160 and transmitted to communication terminal 100-2. Similarly, in communication terminal 100-2, the user identifier, group attributes, gesture data, the message data are read from the storage unit of communication terminal 100-2 and transmitted to communication terminal 100-1. As a result, each communication terminal 100 obtains a user identifier, group attributes, gesture data, and message data of a correspondent terminal After an exchange of the above-described data, the radio link is released to terminate the inter-terminal communication (S105). Each communication terminal stores the message data received from the correspondent terminal in storage unit 160 (S106).

Next, in each of communication terminals 100-1 and terminal 100-2, group attributes received from the correspondent terminal and gesture data stored in storage unit 160 are compared. Specifically, whether groups specified by the group attributes are the same is determined (S107). If the groups are the same, for example both groups are "Red" (S107; YES), communication terminal 100 does not perform further processing and maintains the sleep mode. If the groups are different, for example, the group attributes represent "Red," and "White," respectively (S107; NO), a result of the game based on the gesture data received from the correspondent terminal and the gesture data stored in storage unit 160 of communication terminal 100-1 (Functions 2 and 3; S108) is determined. If communication terminal 100-1 is still in the sleep mode, processing temporarily ends.

In each of communication terminals 100-1 and 100-2, when the sleep mode ends (S109) the game applicaiton performs Functions 5, 6 and 7 (S110). At conjuncture, if a match result is stored in storage unit 160 (S107; NO), the match result is displayed in display 140 (S111). For example, in a case where the match result represents "loss" and "win" in communication terminals 100-1 and 100-2, respectively, messages "You lost the game." and "You won the game!" are displayed, respectively. If the group attributes are the same (S107; YES), and therefore, no match result is stored, the message data received from the correspondent terminal 100 is read from storage unit 160 and a message according to the read message data is displayed (S113).

Next, in each of communication terminals 100-1 and 100-2, a match result is transmitted via second communication unit 130 to server 300 (S112). Specifically, the MAC addresses of communication terminal 100 and the correspondent terminal 100 (i.e., opponent of the game), group attribute stored in the storage unit of the 100 group attribute received from the correspondent terminal 100, and a match result of the game is transmitted to server 300. The information received by server 300 is added to a record of the match history stored in storage unit 340 unless server 300 has received a result of the same game. In this way, the match history is updated, preferably, a date, time, or place at which inter-terminal communication is performed or other additional information pertaining to a game, model type of communication terminal 100; identifiers of applications stored in storage unit 140, or other information on attributes of communication terminal 100; and user attributes may be transmitted to server 300 together with the match result. In this case, the information described above is stored as additional information of the match history, and processing with regard to a single game at server 300 ends.

(2) Provision of Compiled Results from Server to Communication Terminal

As a game is played with a communication terminal 100, match results pertaining to the communication terminal 100 are accumulated in server 300. A user of communication terminal 100 may wish to know a match history of a whole group, to which a communication terminal 100 or a user of the terminal 100 or belongs. To meet such a demand, communication system 1 is configured to provide a match history from server 300 to communication terminal 100 as required. Also, communication system 1 is configured to provide a user with additional values corresponding to a match history and group attribute. Description will now be directed to the above functions.

Figure 6:
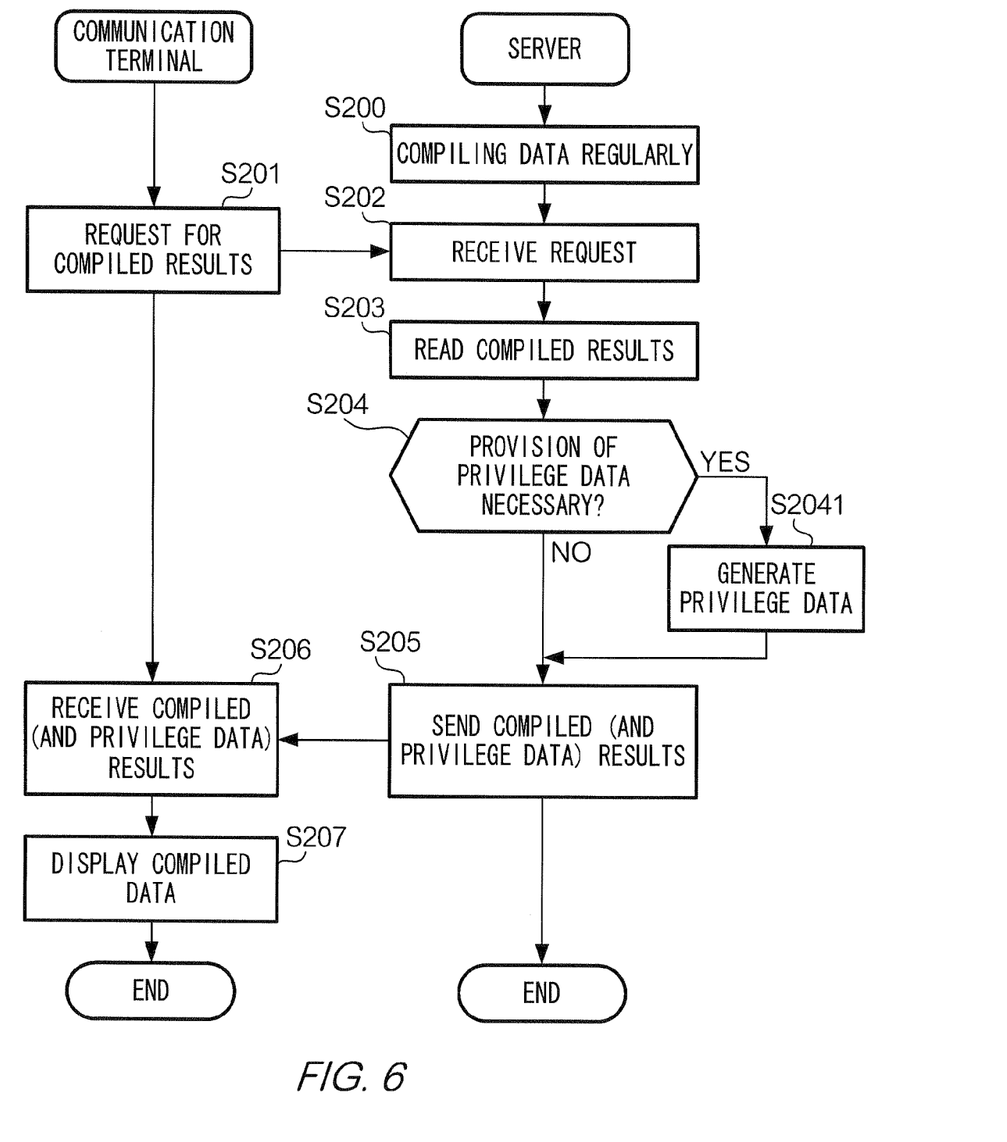
FIG. 6 shows an example of operations of communication terminal 100 and a server 300.

FIG. 6 shows an example of an operation in relation to performing the function described above. Server 300 compiles a match result at a regular interval (S200). Compiling may be initiated when a user performs a predetermined operation, at a preset time, or communication terminal 100 becomes communicable with relay apparatus 200, or another predetermined condition is satisfied. It is supposed that in communication terminal 100 in which a game applicaiton has already been executed, a request signal requesting compiled results, in which a MAC address of communication terminal 100 and the group attribute of communication terminal 100 read from storage unit 160 are included, is generated and transmitted to server 300 (S201).

Upon receipt of the request (S202), server 300 extracts from storage unit 340, group attribute corresponding to the group attribute of the requester among other group attributes (S203). Next, whether provision of privilege data for the communication terminal 100 is determined (S204). Specifically, referring to the match history, if the number of games played by the communication terminal 100 in a predetermined time period in the past is larger than a threshold, it is determined that the provision of privilege data is necessary (S204; YES).

However, if it is determined that privilege data having the same content has already been provided to the same communication terminal 100, with reference to privilege management information, server 300 determines not to provide privilege data regardless of a number of games played (S204; NO).

Upon determination to proceed with generating the privilege data (S204; YES), the privilege data is generated at S2041. For example, in a case where generation of privilege data relates to issuance of electronic money, an amount of electronic money issued for the requesting communication terminal 100 is determined. For example, 10 units of electronic money may be issued each time information on a number of games played at communication terminal 100 is received. Additionally, a ratio of a total number of wins to a total number of losses with regard to a group specified by the group attributes that are the same as communication terminal 100, in other words, a group to which communication terminal 100 belongs has more wins than losses as a whole, additional 5 units of the electronic money are issued. Alternatively, the amount of electronic money may be determined based on winning rates of individual communication terminals 100 and all communication terminals 100 in the same group with regard to games played in a particular time period in the past.

Generated privilege data is transmitted from server 300 to the requesting terminal 100 together with the compiled results (S205). Upon receipt of the compiled results (and privilege data when generated) (S205) by the requesting terminal 100, a notification of reception of the compiled results and content of the privilege data is displayed in display 140 (S207). Thereafter, a series of processing comes to an end. It is possible to omit generation either of the compiled results or the privilege data. Simply put, in this exemplified embodiment a request for information for communication terminal 100 or other communication terminals 100 at which games have been played is transmitted from the communication 100 to server 300, the request is interpreted and a response is regenerated referring to accumulated match results generated at server 300, and the generated response is transmitted to the communication terminal 100.

In communication system 1, when inter-terminal communication occurs, different information processing is performed between correspondence terminals according to different results of a comparison of group attributes with a correspondent terminal. When the correspondent terminal belongs to a group that is the same as the communication terminal, an exchange of messages as information processing is performed to facilitate interaction between users. On the other hand, when the correspondent terminal belongs to a different group, execution of the game application is performed as another information processing by each terminal, so as to enable the user to play a game to determine a winner and a loser. As a result, a user gains a sense of belonging to a particular group or a sense of togetherness through inter-terminal communication. Accordingly, it is expected that a user carrying a communication terminal will be motivated to perform inter-terminal communication by a method according to the exemplary embodiment. Known technology does not have such effects. In addition, transmission of compiled results of games and the privilege data in which the group attribute is reflected from server 300 to communication terminal 100 further strengthens a sense of belonging to a particular group or sense of togetherness.

3. Other Examples

The exemplary embodiment described above is merely one of the examples of the present invention and can be modified. Exemplified aspects for modification will now be described.

(1) With Regard to Determination of a Match Result

In a case where a rock-paper-scissors game ends in a draw, a match result representative of "draw" may be transmitted to server 300. Alternatively, a final decision (winner/loser) may be made at the communication terminals 100 when a first pick ends in a draw. For example, gesture data may include a series of gestures, in other words, a plurality of gestures and an order of selection of such gestures, and the first matchup ends in a draw, i.e., gestures of two users are the same, and a comparison of gestures is performed repeatedly until the game is decided, i.e., picked gestures are different.

(2) With Regard to a Relation between a Result of Comparison of Group Attributes and Information Processing Processing performed by the game application in the exemplary embodiment is not limited to "a game" playable by two players as opponents, but may include information processing such as transmission/reception or calculation of data. In one embodiment, an application for performing processing different from an exchange of messages is provided. In another embodiment, exchange of messages may be omitted. In this case, when the group attributes are the same, no application is executed. In yet another embodiment, a correlation between a result of comparison of the group attributes and selection of the first or second information processing is reversed. In other words, if the groups are the same the game application is executed, while if the groups are different messages are exchanged. Simply put, in the present invention the first or second information processing to be initiated is selected based on a comparison of attributes.

(3) The Number of Correspondent Terminals

It is possible to perform the inter-terminal communication with two or more communication terminals 100 (100-2 and 100-3, for example) at the same time. For example, when three communication terminals 100 are all in the sleep mode, in each of which a game application is executed, and are located in a predetermined distance of each other, a radio link is established for the three communication terminals 100 and a game can be played by three users thereafter. Specifically, each communication terminal 100 transmits a group attribute of the communication terminal and gesture data to each of the other two terminals 100, and receives from each of the other two terminals 100, group attributes and two pieces of gesture data. In each terminal 100, the decision of winner/loser based on the gesture data described above is performed with regard to a correspondent terminal(s) belonging to the same group.

Alternatively, when three or more communication terminals are communicable with each other, it is possible to establish a radio link for each correspondent terminal simultaneously or sequentially, such that an exchange of data is performed between two communication terminals on each radio link. It is possible to play two or more games over a time period during which sleep mode is maintained at a communication terminal with different users. In this case when the time period ends, all of the match results are displayed in the display and transmitted to server 300 collectively. Simply put, it is possible to determine a timing of inter-terminal communication and/or playing of a game independently according to a timing of exchanging data and/or notifying a match result to a user and a server, which takes place subsequent to the inter-terminal communication.

(4) Feedback of Match Results

It is possible to change an operation of a communication terminal based on a match result. For example, communication terminal 100 may include a rewriting unit for rewriting of image data of an avatar or data accessed by a predetermined application. For example, an avatar image may be changed according to a match result and the match result (win or loss) is displayed when the application is executed. Alternatively, the avatar image may be changed according to a group-based match result obtained from server 300 or received privilege data.

(5) Others

Instead of second communication unit, communication terminal 100 may include a comparison unit that communicates with server 300 by wired communication. For example, one of communication terminals 100-1 and 100-2 may be a desktop personal computer or other non-mobile terminal that communicates with the other mobile terminal by radio and with sever 300 by wired communication. Simply put, in the present invention a radio link is established when a distance between two terminals changes such that the two terminals are communicable with each other.

It is possible to execute a comparison of group attributes and the game application with assistance of a server in a case where inter-terminal communication has not occurred. Specifically, communication terminal 100 may include a unit that obtains present time and location information indicative of a location of communication terminal 100 by receiving a radio wave transmitted by a GPS system. Obtained location information and time is transmitted from communication terminal 100 to server 300 at a predetermined timing. The gesture data and message data are transmitted from communication terminal 100 to server 300 in advance. Server 300 stores group attributes, gesture data, and message data correspondingly in storage unit 340 for all communication terminals 100. An application similar to the game application stored in communication terminal 100 is also stored in storage unit 340. Server 300 specifies a pair(s) of communication terminals 100, which are located in a predetermined range based on location information and time obtained from the communication terminals 100 at a predetermined timing. For each of the pairs, a comparison of the group attributes and the game application using a result of the comparison is performed, and a generated match result is transmitted to the communication terminals 100. Compiled results and privilege data may also be transmitted together with the match result. In each communication terminal 100 a received match result is displayed. On the other hand, if the group attributes of the two communication terminals of a pair is the same, server 300 does not execute the game application and instead transmits the message data to the communication terminals 100 such that message data are exchanged between the two terminals.

A communication terminal according to the exemplary embodiment may include a gamer console, mobile phone, smart phone, PDA, laptop computer, or other information processing device. Also, any appropriate method for implementing the functions described above by hardware resources can be adopted. A program executable in communication terminal 100, by which the functions are implemented, can be stored in a magnetic recording medium such as a magnetic tape device, magnetic disk (hard drive, flexible disk drive, or the like), optical recording medium such as CD and DVD, a magneto-optical recording medium, or a semiconductor memory, or other computer-readable storage medium, or alternatively, can be provided via the Internet.

The foregoing description of the embodiments of the present invention is provided for purposes of illustration and description, and is in no way to be taken as either exhaustive or specifically limitative of the present invention; and it will be obvious to those skilled in the art that a wide range of modifications and variations can be applied to the invention described in the exemplified embodiments, with such embodiments having been chosen merely with a view to providing a clear explanation of the principles of the present invention and its range of practical application, thereby to enable others skilled in the art to understand the invention in the context of a variety of embodiments, which can be adopted in the scope of the invention so as to best suit a contemplated use. The scope of the invention is intended to be defined by the claims that follow and equivalents thereof.

What is claimed is:

1. A communication system which includes a plurality of communication terminals and a server communicable with the plurality of the communication terminals, each communication terminal comprising:
   a memory that stores a group attribute representative of an attribute of a particular group, the group attribute being pre-assigned to one or more communication terminal or to one or more user of a communication terminal;
   a first communication unit that transmits a group attribute stored in the memory of the communication terminal to a correspondent terminal located within a predetermined range from the communication terminal, and receives from the correspondent terminal a group attribute stored in a memory of the correspondent terminal;
   a second communication unit capable of transmitting data to the server; and
   a controller that compares a group attribute received from a correspondent terminal with the group attribute stored in the memory of the communication terminal and performs selectively one of a first information processing procedure and a second information processing procedure based on a result of the comparison, wherein the controller performs the first information processing procedure when the group attribute received by the communication unit and the group attribute stored in the memory of the communication terminal are different, and the controller performs the second information processing procedure when the group attribute received by the communication unit and the group attribute stored in the memory of the communication terminal are the same, and wherein the second communication unit transmits to the server an output of the first information processing procedure if performed by the controller.

2. The system according to claim 1, wherein:
   the memory further stores first data for comparison with data stored in the memory of the correspondent terminal, the communication unit transmits the first data stored in the memory of the communication terminal to the correspondent terminal and receives from the correspondent terminal first data stored in the memory of the correspondent terminal; and
   the controller compares the first data stored in the memory of the communication terminal with the first data received by the communication unit in accordance with the first information processing procedure.

3. The system according to claim 2, wherein the controller executes a game application using the data stored in the memory of the communication terminal and the data received by the communication unit.

4. The system according to claim 1, wherein the server includes a collecting unit that collects data transmitted from each communication terminal.

5. The system according to claim 4, wherein the collecting unit collects the results based on a group specified by the group attribute.

6. The system according to claim 4, wherein each communication terminal includes an obtaining unit that receives a result output by the collecting unit from the server.

7. The system according to claim 4, wherein:
   the server updates the group attribute based on the result output by the collecting unit; and
   an updated group attribute output by the collecting unit is stored in the memory.

8. The system according to claim 4, wherein the server includes:
   a generation unit that generates second data representative of privileges offered to a communication terminal or to a user of a communication terminal based on data received from each communication terminal; and
   a transmission unit that transmits the second data generated by the generation unit to the communication terminal.

9. The system according to claim 1, wherein:
   the memory further stores third data to be output at the correspondent terminal;
   the communication unit transmits third data stored in the memory of the communication terminal to the correspondent terminal and receives from the correspondent terminal third data stored in the memory of the correspondent terminal; and
   the controller outputs third data received by the communication unit in accordance with the second information processing procedure.

10. A communication method implemented by one or more communication terminals having a transmitter, a receiver, a data storage memory and at least one CPU or other processor, the method comprising:
   transmitting a group attribute stored in a memory of a communication terminal to a correspondent terminal located within a predetermined range from the communication terminal, the group attribute representative of an attribute of a particular group of communication terminals, the group attribute being pre-assigned to one or more communication terminal or to one or more user of a communication terminal;
   receiving, from the correspondent terminal, a group attribute stored in a memory of the correspondent terminal located within the predetermined range from the communication terminal;
   comparing a received group attribute with the group attribute stored in the memory of the communication terminal and performing selectively one of a first information processing procedure and a second information processing procedure based on a result of the comparison, wherein the at least one CPU or other processor performs the first information processing procedure when the group attribute received by the communication unit and the group attribute stored in the memory of the communication terminal are different, and wherein the at least one CPU or other processor performs the second information processing procedure when a group attribute received from the correspondent terminal and the group attribute stored in the memory of the communication terminal are the same, and if the first information processing procedure is performed, transmitting an output of the first information processing procedure to a server computer that is communicable with the group of communication terminals.

11. A non-transient computer readable storage medium storing a computer program which when executed by a CPU or other processor of a communications terminal having a transmitter, a receiver, a data storage memory and at least one CPU or other processor causes the communications terminal to perform operations comprising:

transmitting a group attribute stored in a memory of the communication terminal to a correspondent terminal located within a predetermined range from the communication terminal, the group attribute representative of an attribute of a particular group of communication terminals, the group attribute being pre-assigned to one or more communication terminal or to one or more user of a communication terminal;

receiving, from the correspondent terminal, a group attribute stored in a memory of the correspondent terminal located within the predetermined range from the communication terminal;

comparing a received group attribute with the group attribute stored in the memory of the communication terminal and performing selectively one of a first information processing procedure and a second information processing procedure based on a result of the comparison, wherein the at least one CPU or other processor performs the first information processing procedure when the group attribute received by the communication unit and the group attribute stored in the memory of the communication terminal are different, and wherein the at least one CPU or other processor performs the second information processing procedure when a group attribute received from the correspondent terminal and the group attribute stored in the memory of the communication terminal are the same, and if the first information processing procedure is performed, transmitting an output of the first information processing procedure to a server computer that is communicable with the group of communication terminals.

12. A communication terminal having a transmitter, a receiver, a data storage memory and at least one CPU or other processor, comprising:

a memory that stores a group attribute representative of an attribute of a particular group, the group attribute being pre-assigned to one or more communication terminal or to one or more user of a communication terminal;

a first communication unit that transmits a group attribute stored in the memory of the communication terminal to a correspondent terminal located within a predetermined range from the communication terminal, and receives from the correspondent terminal a group attribute stored in a memory of the correspondent terminal;

a second communication unit capable of transmitting data to a server computer; and a controller that compares a group attribute received from a correspondent terminal with the group attribute stored in the memory of the communication terminal and performs selectively one of a first information processing procedure and a second information processing procedure based on a result of the comparison, wherein the controller performs the first information processing procedure when the group attribute received by the communication unit and the group attribute stored in the memory of the communication terminal are different, and the controller performs the second information processing procedure when the group attribute received by the communication unit and the group attribute stored in the memory of the communication terminal are the same, and wherein the second communication unit transmits to the server computer an output of the first information processing procedure if performed by the controller.

* * * * *